US005630952A

United States Patent [19]

Karino et al.

[11] Patent Number: 5,630,952

[45] Date of Patent: May 20, 1997

[54] PLASMA-ARC POWER SUPPLY APPARATUS

[75] Inventors: Kunio Karino, Suita; Haruo Moriguchi, Itami; Toshikazu Fujiyoshi, Kawanishi; Atsushi Kinoshita, Osaka; Takashi Hashimoto, Suma-ku, all of Japan

[73] Assignee: Sansha Electric Manufacturing Company, Limited, Osaka, Japan

[21] Appl. No.: 579,254

[22] Filed: Dec. 27, 1995

[30] Foreign Application Priority Data

Dec. 27, 1994 [JP] Japan .................................... 6-339850

[51] Int. Cl.$^6$ .................................................... B23K 10/00

[52] U.S. Cl. ................................ 217/121.57; 219/121.54

[58] Field of Search ......................... 219/121.54, 121.55, 219/121.56, 121.57, 121.48, 75

[56] References Cited

U.S. PATENT DOCUMENTS

| | | | |
|---|---|---|---|
| 5,170,030 | 12/1992 | Solley et al. | 219/121.48 |
| 5,225,658 | 7/1993 | Yamaguchi et al. | 219/121.57 |
| 5,506,384 | 4/1996 | Yamaguchi | 219/121.57 |
| 5,530,220 | 6/1996 | Tatham | 219/121.57 |

FOREIGN PATENT DOCUMENTS

| | | |
|---|---|---|
| 675791 | 9/1994 | Japan . |

*Primary Examiner*—Mark H. Paschall
*Attorney, Agent, or Firm*—William H. Murray; Robert E. Rosenthal

[57] ABSTRACT

A plasma-arc power supply apparatus includes a main electrode terminal, a nozzle electrode terminal and a workpiece terminal which are respectively coupled to a main electrode, a nozzle electrode and a workpiece of a plasma-arc apparatus. A DC power supply has its first output terminal coupled to the main electrode terminal, and a second output terminal. A pilot arc path is coupled between the second output terminal and the nozzle electrode terminal. A switch is connected in the pilot arc path. A plasma-arc path is coupled between the second output terminal and the workpiece terminal. A current detector has its first input coupled to the plasma-arc path, has its second input coupled to the pilot arc path, and produce a detection signal corresponding to the values of pilot arc and plasma-arc currents in the pilot arc and and plasma-arc paths, respectively. When the pilot arc current is flowing, a control unit closes the switch and controls current from the DC power supply in accordance with the difference between detection signal and a predetermined pilot arc reference signal, and when the plasma-arc current is flowing, the control unit opens the switch and controls current from the DC power supply in accordance with the difference between the detection signal and a predetermined plasma-arc signal.

3 Claims, 3 Drawing Sheets

PLASMA-ARC POWER SUPPLY APPARATUS

The present invention relates to a plasma-arc power supply apparatus for a plasma-arc system, such as a plasma-arc cutter and a plasma-arc welder, for cutting or welding workpieces by means of a plasma-arc.

BACKGROUND OF THE INVENTION

For example, one of prior art plasma-arc cutters with a plasma-arc power supply apparatus generates a plasma-arc between a main electrode and a workpiece by utilizing a pilot arc generated between the main electrode and a nozzle electrode. The main and nozzle electrodes are disposed on a plasma-torch. For example, Japanese Examined Patent Publication No. HEI 6-75791 describes a technique for stabilizing a pilot arc and a plasma-arc. According to the technique disclosed in this Japanese patent publication, a first output terminal of a DC power supply device which converts AC power into DC power is connected to a nozzle electrode on a plasma torch through a series circuit including arc current detecting means, a current limiting resistor and a switch, while a second output terminal of the DC power supply device Is connected through a high frequency generator to a main electrode on the plasma torch. The high frequency generator is used to apply a high frequency voltage between the main and nozzle electrodes for generating a pilot arc therebetween. These components form a pilot arc generating circuit for generating a pilot arc between the main and nozzle electrodes. DC current flowing through the pilot arc generating circuit, i.e. a pilot current Ip is detected by the arc current detecting means.

The first output terminal of the DC power supply device is also connected to a workpiece through the arc current detecting means and cutting current detecting means, which form a plasma-arc generating circuit for generating a plasma-arc between the main electrode and the workpiece. DC current flowing in the plasma-arc generating circuit, i.e. a plasma-arc current Ic is detected by the arc current detecting means and the cutting current detecting means.

A detection signal from the arc current detecting means which represents the detected pilot current Ip or plasma current Ic is applied to a constant current control circuit. The constant current control circuit receives a reference value from reference value setting means. The constant current control circuit controls the DC power supply device in such a manner as to make the detection signal from the ac current detecting means equal to the reference value. The reference value set by the reference value setting means is switched to a reference value for use in controlling the plasma current Ic when the level of the detection signal from the cutting current detecting means reaches a predetermined level.

In operation of the above-described plasma cutter, when the switch is closed and the high frequency generator is activated, a pilot arc is generated between the main and nozzle electrodes so that a pilot current Ip flows. In this stage, no plasma arc has been generated yet between th main electrode and the workpiece, and the current Ia flowing through the arc current detecting means is only the pilot current Ip. Thus, the arc current detecting means detects only the pilot current Ip. The constant current control circuit controls the DC power supply device in such a manner that the pilot current Ip detected by the arc current detecting means is at a constant value as determined by the reference value set by the reference value setting means.

By bringing the plasma torch closer to the workpiece while the pilot arc is present, a plasma-arc is generated between the main electrode and the workpiece so that the plasma current Ic flows. Then, the switch is opened to cause the pilot arc to cease so that the current Ia flowing through the arc current detecting means is provided by the plasma current Ic only. At the same time, the level of the detection-signal of the plasma current detecting means reaches the predetermined level. Accordingly, th reference value set by the reference value setting means is switched to the reference value for use in controlling the plasma current Ic. Then, the constant current control circuit controls the DC power supply device in such a manner that the plasma current Ic is maintained at a constant value as determined by the reference value for controlling the plasma current Ic.

According to the above-described prior art apparatus, the plasma current Ic flows in both of the arc current detecting means and the cutting current detecting means. Generally, the plasma current Ic is significantly larger than the pilot current Ic, and is a large current o for example, several hundred amperes. In order to detect such a large current Ic, the detecting means must have large current capacity. Then, the above-described prior art apparatus requires two of such large capacity current detecting means, which, in turn, disadvantageously causes the size of the plasma-arc cutter to become larger.

An object of the present invention, therefore, is to provide a plasma-arc power supply apparatus which can be of a size smaller than that of prior art apparatus, by using current detecting means having current capacities appropriate for detecting the pilot current Ip and the plasma current Ic, respectively, so that the number of large current capacity detecting means as required in the above-described prior art apparatus can be reduced to one so that the plasma-arc cutter as a whole can be fabricated smaller. Another object of the present invention is to provide a plasma-arc power supply apparatus in which both of the pilot current Ip and the plasma current Ic can be detected by a single current detecting means.

SUMMARY OF THE INVENTION

According to a first aspect of the present invention, a plasma-arc power supply apparatus is provided which supplies a DC current to a plasma load. The plasma load includes a main electrode, a nozzle electrode surrounding the main electrode with a spacing disposed therebetween, and a workpiece which is to be disposed with a spacing disposed between the main electrode and the workpiece.

The power supply Includes a main electrode terminal adapted to be connected to the main electrode, a nozzle electrode terminal adapted to be connected to the nozzle electrode, and a workpiece terminal adapted to be connected to the workpiece.

The power supply further includes variable DC power supply means with first and second output terminals. The variable DC power supply means provides a variable DC output current in response to a current control signal. The first output terminal is connected to the main electrode terminal.

Switch means is disposed between the second output terminal and the nozzle electrode terminal. The switch means is opened and closed in response to an open control signal and a close control signal, respectively.

Between the second output terminal and the nozzle electrode terminal, pilot arc current detecting means is connected in series with the switch means, for detecting a pilot arc current which flows through the nozzle electrode and the main electrode.

Plasma-arc current detecting means is connected between the second output terminal and the workpiece terminal, for detecting the plasma-arc current flowing between the main electrode and the workpiece and generating a plasma-arc current detection signal for the detected plasma-arc current.

Control means provides the close control signal for the switch means when the plasma-arc current is equal to or a lower than a predetermined level, and also provides the current control signal dependent on the difference between the pilot arc current detection signal and a predetermined pilot-arc reference signal to the variable DC power supply means to thereby control the pilot arc current to have a value corresponding to the pilot arc reference signal.

When the plasma-arc current is higher than the predetermined level, the control means supplies the open control signal to the switch means, and also provides the current control signal dependent on the difference between the plasma-arc current detection signal and a predetermined plasma arc reference signal to the variable DC power supply means to thereby control the plasma-arc current to have a value corresponding to the plasma-arc reference signal.

The control means may include control means for the switch means, and control means for the variable DC power supply means. The switch means control means provides the close control signal to the switch means when the plasma-arc current is equal to or less than the predetermined level, and provides the open control signal to the switch means when the plasma-arc current exceeds the predetermined level. The variable DC power supply means control means provides the current control signal, which is dependent on the difference between the pilot arc current detection signal and the pilot arc reference signal, to the variable DC power supply means to control the pilot arc current to have a value corresponding to the pilot arc reference signal when the plasma-arc current is equal to or less than the predetermined level. When the plasma-arc current is higher than the predetermined level, the variable DC power supply means control means provides the current control signal, which is dependent on the difference between the plasma-arc detection signal and the plasma-arc reference signal, to the variable DC power supply means to control the plasma-arc current to have a value corresponding to the plasma-arc reference signal.

According to a second aspect of the present invention, a plasma-arc power supply apparatus is provided which supplies a DC current to a plasma load. The plasma load includes a main electrode, a nozzle electrode surrounding the main electrode with a spacing disposed therebetween, and a workpiece which is to be disposed with a spacing disposed between the main electrode and the workpiece.

The power supply includes a main electrode terminal adapted to be connected to the main electrode, a nozzle electrode terminal adapted to be connected to the nozzle electrode, and a workpiece terminal adapted to be connected to the workpiece.

The power supply further includes variable DC power supply means with first and second output terminals, with the first output terminal connected to the main electrode terminal. A pilot arc path is connected between the second output terminal of the variable DC power supply means and the nozzle electrode terminal. The pilot arc path supplies a pilot arc current from the variable DC power supply means to flow between the main and nozzle electrodes to cause a pilot arc to be generated between them.

Switch means is connected in the pilot arc path. The switch means is opened add closed in response to open and close control signals, respectively.

A plasma-arc path is connected between the second output terminal and the workpiece terminal. The plasma-arc path supplies a plasma-arc current from the variable DC power supply means to flow between the main electrode and the workpiece to cause a plasma-arc to be generated between the main electrode and the workpiece.

Current detecting means has its first input connected to the plasma-arc path and has its second input connected to the pilot arc path. The current detecting means develops at its output detection a signal corresponding to the values of the pilot arc and plasma-arc currents.

When the detection signal from the current detecting means indicates the presence of the pilot arc current, control means provides the close control signal to the switch means and provides a current control signal which is dependent on the difference between the detection signal and a predetermined pilot arc reference signal, to the variable DC power supply means to control the pilot arc current to have a value corresponding to the pilot arc reference signal. When the detection signal indicates the flow of the plasma-arc current, the control means provides the open control signal to the switch means and also provides the current control signal which is dependent on the difference between the detection signal and a predetermined plasma-arc reference signal, to the variable DC power supply means to control the plasma-arc current to have a value corresponding to the plasma-arc reference signal.

The current detecting means may include a direct current transformer and detection signal output means. The direct current transformer includes primary windings which are the pilot arc path and the plasma-arc path wound on a core, and a secondary winding wound on the core for providing a secondary current corresponding to the current flowing through each primary winding. The detection signal output means detects the secondary current and develops a detection signal which is dependent on the magnitude of the secondary current.

The direct current transformer may have a larger number of conductor turns for the plasma-arc path than for the pilot arc path.

The plasma-arc path conductor may be wound on the core in the opposite direction to the pilot arc path conductor.

The control means may include switch means control means and variable DC power supply means control means. The switch means control means provides the close control signal to the switch means when the detection signal is equal to or higher than a reference level which indicates that the pilot arc current is flowing, and provides the open control signal to the switch means when the detection signal is below the reference level.

When the detection signal is equal to or above the reference level, which indicates that the pilot arc current is flowing, the variable DC power supply means control means provides to the variable DC power supply means the DC current control signal which is dependent on the difference between the detection signal and the pilot arc reference signal to control the pilot are current to have a value corresponding to the pilot are reference signal. The variable DC power supply means control means, when the detection signal is below the reference level, provides to the variable DC power supply means the DC current control signal which is dependent on the difference between the detection signal and the plasma-arc reference signal to control the plasma-arc current to have a value corresponding to the plasma-arc reference signal.

The plasma-are path and the pilot are path may include conductors wound in opposite directions on a core, with the conductor of the plasma-arc path being larger in number of conductor turns than the conductor of the pilot arc path, and the control means may include polarity judging means and variable DC power supply means control means. The polarity judging means provides the close control signal to the switch means when the detection signal is of a first polarity, and provides the open control signal to the switch means when the detection signal is of a second polarity. When the detection signal is of the first polarity, the variable DC power supply means control means provides to the variable DC power supply means the DC current control signal in accordance with the difference between the detection signal and the pilot arc reference signal. The variable DC power supply means control means provides the DC current control signal to the variable DC power supply means in accordance with the difference between the detection signal and the plasma-are reference signal when the detection signal is of the second polarity.

The variable DC power supply means control means may include first error amplifying means for providing an output signal representative of the difference between the detection signal and the pilot arc reference signal, polarity inverting means for inverting the polarity of the detection signal, second error amplifying means for providing an output signal representative of the difference between the output signal of the polarity inverting means and the plasma-arc reference signal, and selecting means for selecting the output signal of the first error amplifying means when the detection signal is of the first polarity and for selecting the output signal of the second error amplifying means when the detection signal is of the second polarity.

The variable DC power supply means control means may include absolute value converting means to which the detection signal is applied, selecting means for selecting the pilot arc reference signal in response to the close control signal from the polarity judging means and for selecting the plasma-arc reference signal in response to the open control signal from the polarity judging means, and error amplifying means for providing an output signal representative of the difference between the output signal of the absolute value converting means and the selected one of the reference signals which has been selected by the selecting means.

DESCRIPTION OF PREFERRED EMBODIMENTS

Figure 1:
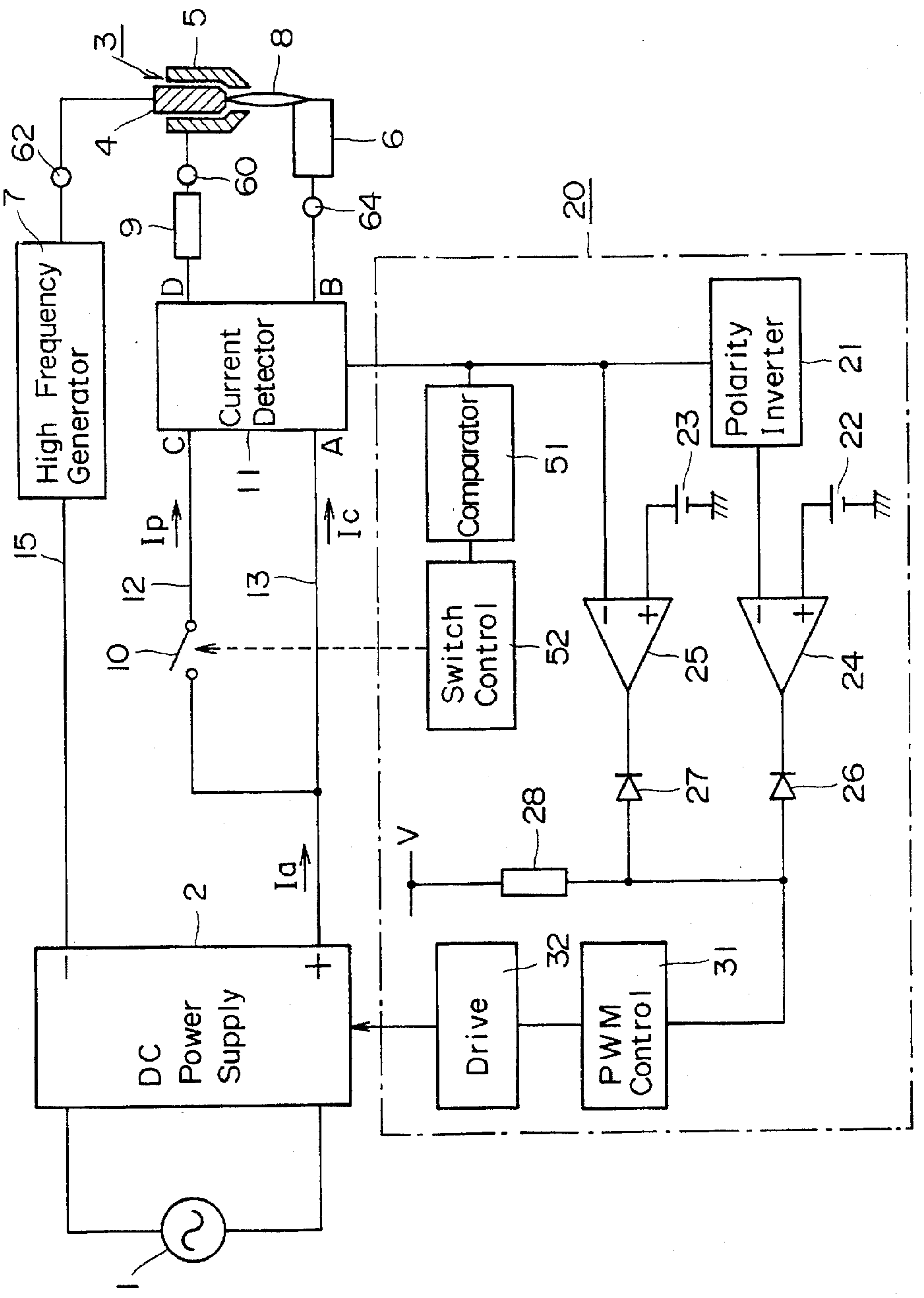
FIG. 1 is a block diagram of a plasma-are cutter including a plasma-arc power supply apparatus according to a first embodiment of the present invention.

A plasma-arc cutter with a plasma-are power supply apparatus according to a first embodiment of the invention is now described with reference to FIGS. 1 and 2.

The plasma-arc cutter includes a plasma torch having a main electrode 4 and a nozzle electrode 5. The nozzle electrode 5 surrounds the main electrode 4 with a spacing disposed between them. A pilot are is generated between the nozzle electrode 5 and the main electrode 4, and, thereafter, the plasma torch 3 is moved closer to a workpiece 6 so that a plasma-arc is induced by the pilot arc between the main electrode 4 and the workpiece 6. The main electrode 4, the nozzle electrode 5 and the workpiece 6 form a plasma load.

The plasma-arc cutter includes variable DC power supply means, for example, a DC power supply 2 which converts AC current from an AC supply 1 into DC output current. The DC output current from the DC power supply 2 is the energy source for pilot and plasma arcs 8.

The DC power supply 2 includes an input rectifier circuit which rectifies the AC current applied thereto, and an input smoothing circuit for smoothing the output of the input rectifier circuit. The DC power supply 2 also includes an inverter which converts the output of the smoothing circuit into high frequency AC current. The inverter may include, for example, control switching devices. Furthermore, the DC power supply 2 includes an output rectifier circuit for rectifying the high frequency AC current and an output smoothing circuit for smoothing the output of the output rectifier circuit. The inverter is responsive to a current control signal provided by a control unit 20, which will be described later, to control the high frequency AC current.

One of the output terminals, e.g. a positive terminal, of the DC power supply 2 is connected through a pilot arc path 12 to a nozzle electrode terminal 60 which is connected to the nozzle electrode 5. A switch 10, a current detector 11 and a current limiting resistor 9 are connected in series in the pilot arc path 12. The other terminal, e.g. negative terminal, of the DC power supply 2 is connected through a common path 15 to a main electrode terminal 62 which is connected to the main electrode 4. A high frequency generator 7 is connected in the common path 15. A current flowing through the pilot arc path 12, which is a pilot current Ip, is detected by the current detector 11. The high frequency generator 7 supplies high frequency voltage between the main electrode 4 and the nozzle electrode 5 to cause a pilot arc to be generated between them.

The positive terminal of the DC power supply 2 is coupled also to a workpiece terminal 64 through a plasma-arc path 13. The workpiece terminal 64 is coupled to the workpiece 6. The current detector 11 is interposed in the plasma-arc path 13. The current detector 11 detects also current in the plasma-arc path 13 or plasma current Ic.

Figure 2:
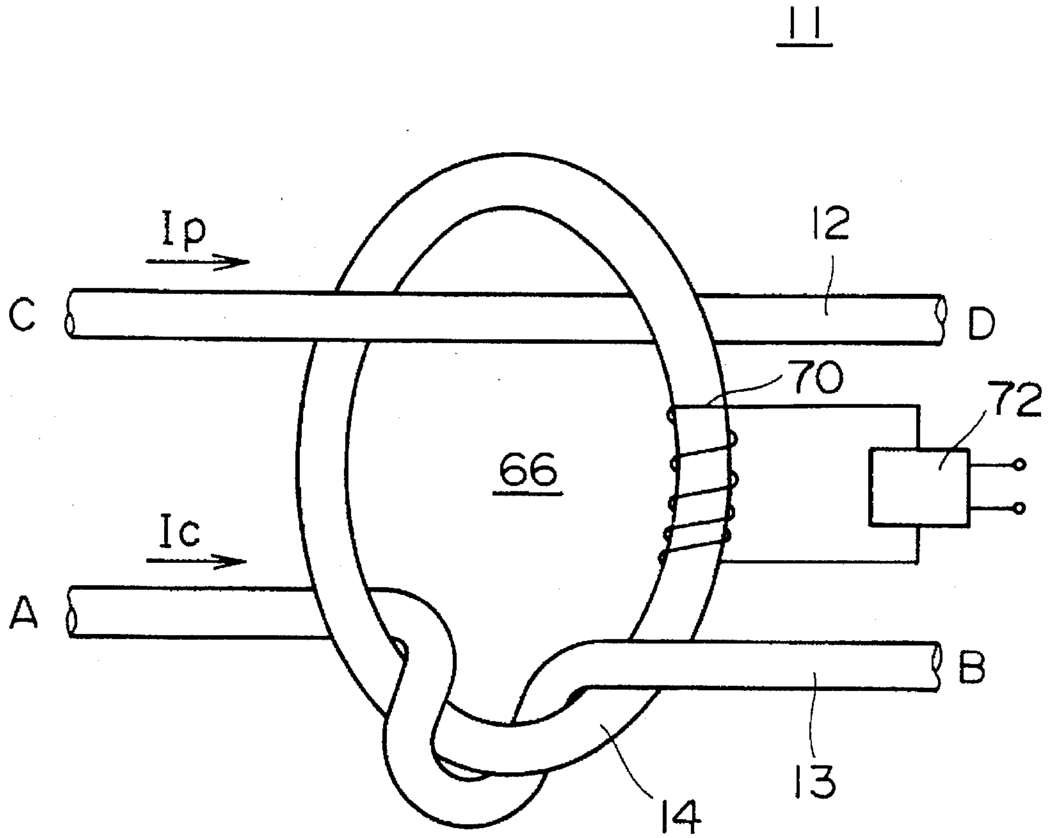
FIG. 2 is schematic view of a current detector used in the plasma-arc power supply apparatus of FIG. 1.

As shown in FIG. 2, the current detector 11 includes a direct current transformer 66. The direct current transformer 66 includes an annular core 14 on which a conductor of the pilot arc path 12 and a conductor of the plasma-arc path 13 are wound as primary windings. A detection winding 70 is also wound on the core 14 as a secondary winding. A detection signal output unit 72 including, for example, a Hall element 72 is connected to the detection winding 70 to detect the current flowing through the winding 70 and develops a detection signal representative of the value of the current.

As shown in FIG. 2, the conductor of the pilot arc path 12 and the conductor of the plasma-arc path 13 are wound in the opposite directions to each other. Accordingly, the transformer current developed in the winding 70 by the pilot current Ip and the transformer current developed in the winding 70 by the plasma current Ip flow in the directions opposite to each other. The detection signal output unit 72 which detects the respective transformer currents provides detection signals corresponding to the respective transformer currents, which are of opposite polarities. In the illustrated embodiment, the primary and secondary windings are wound in such a manner that the detection signal for the pilot current Ip has a negative polarity, while the detection signal for the plasma current Ic is positive.

The respective transformer currents in the detection winding 70 induced by the pilot and plasma currents Ip and Ic flow in the opposite directions. Accordingly, when the current Ip and Ic flow in the pilot arc path 12 and the plasma-arc path 13, respectively, current corresponding to the difference between the transformer currents induced by the currents Ip and Ic flows in the detection winding 70, and he detection signal output unit 72 develops a detection signal corresponding to the difference between the transformer currents. The current detector 11 has a sufficient current capacity which can handle relatively large pilot and plasma currents Ip and Ic.

As shown in FIG. 2, the number of conductor turns of the plasma-arc path 13 on the core 14 is larger than that of the pilot arc path 12. In the illustrated embodiment, however, the conductor of the pilot arc path 13 is not actually wound around the core 14, but it only path through the window in the annular core 14, while the conductor of the plasma-arc path 13 is wound in one turn around the core 14. Accordingly, if both of the pilot and plasma currents Ip and Ic are flowing at the same time, and if the pilot current Ip is slightly larger than the plasma current Ic, for example, if the pilot current Ip is larger than but less than twice as large as the plasma current Ic, the difference current flows in the winding 70 in the direction same as the transformer current induced by the plasma current Ic so that a positive detection signal is developed from the detection signal output unit 72.

The detection signal from the current detector 11 is applied to a comparator 51 and to an inverting input terminal of an error amplifier 25, which are included in the control unit 20. The detection signal is also coupled to an inverting input terminal of an error amplifier 24 through an polarity inverter 21 which is designed to invert the polarity of the detection signal from the current detector 11.

The comparator 51 compares the detection signal from the current detector 11 with a reference level, e.g. 0 level. The comparator 51 provides a close control signal, e.g. an ON signal, to a switch control 52 when the detection signal from the current detector 11 is zero or less than zero or negative, and provides an open control signal or OFF signal to the switch control 52 when the detection signal is above zero or positive. Thus, the comparator 51 functions as means for judging the polarity of the detection signal. The switch control 52 selectively opens and closes the switch 10 in response to the ON and OFF signals, respectively.

A non-inverting input terminal of the error amplifier 24 receives a positive polarity pilot arc reference signal from a pilot arc reference signal source 22. A non-inverting input terminal of the error amplifier 25 receives a positive polarity plasma-arc reference signal from a plasma-arc reference signal source 23. The error amplifier 25 amplifies the difference between the detection output from the current detector 11 and the plasma-arc reference signal, and the error amplifier 24 amplifies the difference between the inverted version of the detection signal and the pilot arc reference signal. The error amplifiers 24 and 25 are driven from a circuit supply V.

When the detection signal from the current detector 11 is positive, the error amplifier 25 develops an output voltage which is an amplified version of the difference between the detection signal and the plasma-arc reference signal, which output voltage is smaller than the voltage of the circuit supply V. The error amplifier 25 develops an output voltage which is equal to the voltage of the circuit supply V when the detection signal from the current detector 11 is negative.

The error amplifier 24 develops an output voltage which is an amplified version of the difference between the output from the polarity inverter 21 and the pilot arc reference signal and which is smaller than the voltage of the circuit supply V, when the the output of the polarity inverter 21 is positive, i.e. when the detection signal is negative. The error amplifier 24 develops an output voltage which is equal to the voltage of the circuit supply V when the inverter output is negative, i.e. when the detection signal is positive.

The outputs of the error amplifiers 24 and 25 are coupled to the input of a PWM (pulse width modulation) control circuit through diodes 26 and 27, respectively. The diodes 26 and 27 have their anodes coupled to the PWM control circuit 31 and have their cathodes coupled to the outputs of the error amplifiers 24 and 25, respectively. The anodes of the diodes 26 and 27 are coupled also to the circuit supply V through a resistor 28.

When the detection signal from the current detector 11 is positive, the output voltage of the error amplifier 24 is equal to the voltage of the circuit supply V and, therefore, the diode 26 is not conductive. At this time, the output voltage of the error amplifier 25 is an amplified version of the difference between the detection signal from the current detector 11 and the plasma-arc reference signal and is smaller than the voltage of the circuit supply V. Accordingly, the diode 27 is conductive, and the output voltage is coupled to the PWM control circuit 31.

On the other hand, if the detection signal from the current detector 11 is negative, the output voltage of the error amplifier 25 is equal to the voltage of the circuit supply V and the diode 27 is non-conductive. At this time, the output voltage from the error amplifier 24 is an amplified version of the difference between the output of the polarity inverter 21 and the pilot arc reference signal and is smaller than the voltage of the circuit supply V. Accordingly, the diode 26 becomes conductive, and the output voltage is coupled to the PWM control circuit 31.

The PWM control circuit 31 provides a drive circuit 32 with a current control signal which is dependent on one of the output signals of the error amplifiers 24 and 25 which is not equal to the voltage of the circuit supply V. As a result, the drive circuit 32 is driven to control the inverter of the DC power supply 2. More specifically, when the output voltage from the error amplifier 24 is coupled to the PWM control circuit 31, the PWM control circuit 31 controls the inverter of the DC power supply 2 in such a manner that the output signal of the polarity inverter 21 becomes equal to the pilot arc reference signal. On the other hand, if the output voltage from the error amplifier 25 is applied to the PWM control circuit 31, it controls the inverter of the DC power supply 2 in such a manner that the detection signal from the current detector 11 becomes equal to the plasma-arc reference signal.

Now, the operation of the plasma-arc cutter is described. Let is be assumed that the gap between the main electrode 4 and the nozzle electrode 5 is smaller and the gap between the main electrode 4 and the workpiece 6 to be cut is kept larger. Also let it be assumed that a DC voltage is applied from the DC power supply 2 between the main electrode 4 and the nozzle electrode 5, and between the main electrode 4 and the workpiece 6, but neither a pilot arc nor the plasma-arc 8 is generated. In this state, neither the pilot current Ip nor the plasma current Ic flows. Then, the detection signal from the current detector 11 is zero, and, therefore, the comparator 51 develops the ON signal which causes the switch control 52 to close the switch 10.

In this state, the high frequency generator 7 is activated to apply a high frequency voltage between the main electrode 4 and the nozzle electrode 5, which causes a pilot arc to be generated between the two electrodes. This causes a pilot current Ip to flow in the pilot arc path 12. Since the gap between the main electrode 4 and the workpiece 6 is large, the plasma-arc 8 has not yet been generated. Accordingly, no plasma-arc current Ic flows. The DC output current Ia of the DC power supply 2 flows only through the pilot arc path 12 and the common path 15, and all of the DC output current Ia is the pilot current Ip.

The pilot current Ip is detected by the current detector 11, which develops a negative polarity detection signal having a magnitude depending on the magnitude of the pilot current Ip. This negative detection signal is coupled to the inverting input terminal of the error amplifier 25 and also to the inverting input terminal of the error amplifier 24 via the polarity inverter 21.

Since the detection signal of the current detector 11 is negative, the comparator 51 provides an ON signal to the switch control 52 and, therefore, the switch control 52 maintains the switch 10 close. Thus, the pilot current Ip continues to flow through the pilot arc path 12, which maintains the pilot arc.

The error amplifier 25 amplifies the difference between the negative detection signal and the positive plasma-arc reference signal. Accordingly, the output of the error amplifier 25 is equal to the voltage of the circuit supply V, which renders the diode 27 non-conductive. The error amplifier 24 amplifies the difference between the positive output signal from the polarity inverter 21 which is the polarity inverted version of the negative detection signal, and the pilot arc reference signal, and applies an output signal smaller than the voltage of the circuit supply V through the conductive diode 26 to the PWM control circuit 31.

The PWM control circuit 31 controls the DC power supply 2 through the drive circuit 32 in accordance with the output voltage from the error amplifier 24 in such a manner that the output signal of the polarity inverter 21 becomes equal to the pilot arc reference signal. This makes the DC output current Ia from the DC power supply 2 and, hence, the pilot current Ip have a constant value dependent on the pilot arc reference signal. Thus, the pilot arc is stabilized.

As the plasma torch 3 is brought closer to the workpiece 6, with the pilot arc being present, the plasma-arc 8 is generated between the main electrode 8 and the workpiece 6, being ignited by the pilot arc. This causes a plasma current Ic to flow through the plasma-arc path 13.

At the instant when the plasma-arc 8 is produced, that is, at the instant when the plasma current Ic starts flowing, the DC output current Ia is divided into the pilot arc path 12 and the plasma-arc path 13. In this case, the pilot arc current is larger than the plasma-arc current. The current detector 11 detects both the pilot current Ip and the plasma current Ic. Since, as previously described, the current detector 11 is arranged such that the transformer current induced by the plasma current Ic is larger than the the transformer current induced by the pilot current Ip, the current detector 11 develops the detection signal of positive polarity. The positive detection signal from the current detector 11 is coupled to the comparator 51 and to the inverting input terminal of the error amplifier 25, and also coupled to the inverting input terminal of the error amplifier 24 through the polarity inverter 21.

The comparator 51 develops an OFF signal to the switch control 52 because the detection signal from the current detector 11 is positive. Then, the switch control 52 opens the switch 10. Thus, the pilot current Ip flowing in the pilot arc path 12 is interrupted and the pilot arc disappears. Then, the DC output current Ia of the DC power supply 2 flows only through the plasma-arc path 13 and the common path 15. The entire of the DC output current Ia provides the plasma current Ic, and only this plasma current Ic is detected by the current detector 11. The current detector 11 develops a positive detection signal having a magnitude dependent on the magnitude of the plasma current Ic.

The error amplifier 25 develops an amplified version of the difference between the detection signal and the plasma-arc reference signal. On the other hand, the error amplifier 24 amplifies the difference between the output of the polarity inverter 21, which is a negative, inverted version of the positive detection signal, and the positive reference signal from the source 22, and, therefore, the output voltage of the error amplifier 24 is equal to the voltage of the circuit supply V. Thus, the output voltage from the error amplifier 25 is coupled to the input of the PWM control circuit 31.

The PWM control circuit 31 controls the DC power supply 2 through the drive circuit 32 in accordance with the output voltage from the error amplifier 25 in such a manner that the detection signal from the current detector 11 becomes equal to the plasma-arc reference signal. Thus, the DC output current Ia of the DC power supply 2 and, hence, the plasma current Ic is made to have a constant value corresponding to the plasma-arc reference signal. In this way, the plasma-arc 8 is stabilized.

As described above, the plasma-arc power supply apparatus of the present invention employs a single current detector 11 for detecting both the pilot current Ip and the plasma current Ic. When no plasma current Ic is flowing and, therefore, no plasma arc 8 is being generated, the plasma-arc power supply apparatus controls the pilot current Ip to be constant to thereby stabilize the pilot arc. When the plasma current Ic flows and, therefore, the plasma-arc 8 is generated, the plasma current Ic is controlled to become constant to thereby stabilize the plasma-arc 8. Thus, unlike prior art apparatus, there is no need for using two large current capacity current detectors, which makes it possible to manufacture small-sized plasma-arc power supply apparatus at a low cost.

The current detector 11 can develop a positive detection signal corresponding to the plasma-arc current even when both the pilot and plasma currents Ip and Ic flow simultaneously with the pilot current Ip being larger than the plasma current Ic, e.g. with the pilot current Ip being less than twice as large as the plasma current Ic, which may occur, for example, when the plasma-arc is initiated. With this arrangement, the transition from the pilot arc to the plasma-arc 8 is carried out smoothly.

The present invention has been described by means of a plasma-arc power supply apparatus used in a plasma-arc cutter, but the plasma-arc power supply can be used with other plasma-arc apparatus, such as a plasma-arc welder.

In the above-described embodiment, an inverter-type power supply is used as the DC power supply 2, but the DC power supply 2 is not limited to the inverter-type, but other types, such as a thyristor-type DC power supply, can be used. Furthermore, the direct current transformer 66 constituting the current detector 11 has been described to have a larger number of conductor turns wound on the core 14 for the plasma-arc path 13 than that for the pilot arc path 12, but such relationship in number of conductor turns can be of no significance only if the transformer current induced in the detection winding by the plasma current Ic is larger than the current inducted by the pilot current Ip. Furthermore, the current detector 11 has been described to include a direct current transformer and a detection signal output unit, but it may be any of other suitable current detectors, such as a current detector which uses a shunt circuit.

In the above-described embodiment, the winding direction of the conductor for the pilot arc path 12 on the core 14 is opposite to that for the plasma-arc path 13. This is for the purpose of providing opposed polarities for the pilot current Ip and the plasma current Ic so that the single comparator 51 can judge whether the detection signal from the current detector 11 is at the zero level or above, which discriminates between the currents Ip and Ic. However, they may be wound in the same direction. In such a case, however, the number of conductor turns for the plasma arc path 13 on the core 14 should be larger than the number of conductor turns for the pilot arc path 12 so that the current induced in the detection winding when the plasma current Ic flows is larger than the current induced by the pilot current Ip. With this arrangement, it is possible to know by comparing the level of the detection signal with a reference signal of an appropriate value that the plasma current Ic is flowing and, hence, the plasma-arc 8 has been generated. Thus, a circuit functioning in a similar manner to the control unit 20 is provided.

The current detector 11 has been described to develop a detection signal of the negative polarity in response to the pilot current Ip and a detection signal of the positive polarity in response to the plasma current Ic, but it may be constructed to develop detection signals of opposite polarities. In the this case, the detection signal from the current detector 11 is coupled directly to the error amplifier 24, whereas the output of the polarity inverter 21 is applied to the error amplifier 25 and to the comparator 51.

Separate current detectors may be used in the pilot arc path 12 and the plasma-arc path 13. In this case, if the pilot current Ip is sufficiently smaller than the plasma current Ic, the current detector for the pilot arc path 12 may be of a smaller current capacity than the one for the plasma-arc path 13.

One would consider placing current detecting means in either the input side or output side of the high frequency generator 7, or between the positive terminal of the DC power supply 2 and the node at which the pilot arc path 12 and the plasma-arc path 13 branch. In this case, however, the current detecting means would detect the pilot current Ip when the pilot arc is being generated, and, therefore, even if the plasma torch 3 is brought closer to the workpiece 6 to cause the plasma-arc 8 to be generated, the control unit 20 would tend to maintain the current detected by the current detecting means at a value which can sustain the pilot arc. Accordingly, the plasma current Ic would not increase and, therefore, the transition from the pilot arc to the plasma-arc 8 could not completed.

According to the present invention, the current detector 11 is coupled in the paths 12 and 13 in order to detect the respective pilot and plasma currents to thereby determine when the plasma-arc 8 is initiated, i.e. when the plasma current Ic starts flowing.

The pilot and plasma reference signal sources 22 and 23 may be constructed to provide variable reference signals. Adjustment of the respective reference signal sources will vary the pilot current Ip and the plasma current Ic, which can provide means for adjusting the pilot arc energy and the plasma-arc energy.

The switch 10 may be a semiconductor switching device.

Figure 3:
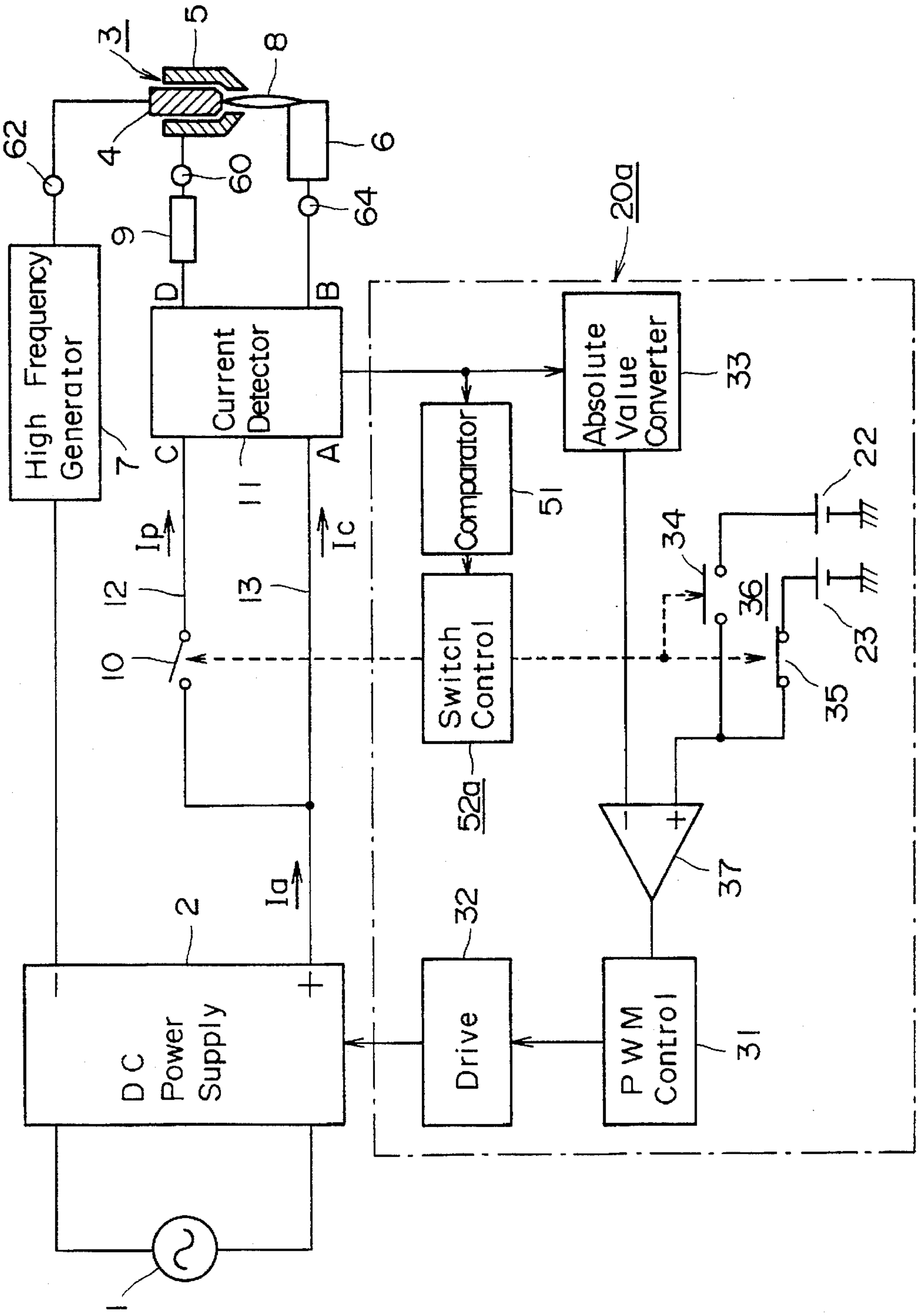
FIG. 3 is a block diagram of a plasma-arc cutter including a plasma-arc power supply apparatus according to a second embodiment of the present invention.

FIG. 3 shows a plasma-arc cutter employing a plasma-arc power supply apparatus according to a second embodiment of the present invention. The plasma-arc power supply apparatus of the second embodiment employs a control unit 20*a* in place of the control unit 20 of the first embodiment. Since the remaining portion is substantially the same as the apparatus of the first embodiment, the same reference numerals are used to the same or similar components and no detailed explanation about them is given.

The control unit 20*a* includes an absolute value converter 33, switches 34 and 35, an error amplifier 37, the PWM control circuit 31, the drive circuit 32, the comparator 51, and a switch control 52*a*.

The detection signal from the current detector 11 is coupled to the comparator 51 and also to an inverting input terminal of the error amplifier 37 via the absolute value converter 33. Regardless of the polarity of the detection signal from the current detector 11, the absolute value converter 33 converts the detection signal into, for example, a positive signal. The absolute value converter 33 may be, for example, a full-wave rectifier circuit.

The comparator 51 provides to the switch control 52*a*, a close control signal, e.g. an ON signal, whenever the detection signal from the current detector 11 is at or less than a reference level, e.g. zero, or, in other words, when the detection signal is zero or negative. When the detection signal is above zero or positive, the comparator 51 provides an open control signal, e.g. an OFF signal to the switch control 52*a*.

The switch control 52*a* is responsive to the output signal from the comparator 51 o open or close the switch 10 and also to control selecting means, for example, the switches 34 and 35 of a reference signal switching circuit 36. The switch control 52*a* closes the switches 10 and 34 and opens the switch 35 when it receives the 0N signal from the comparator 51. The switch control 52*a*, upon receiving the OFF signal from the comparator 51, opens the switches 10 and 34 and closes the switch 35.

The inverting input terminal of the error amplifier 37 receives a selected one of the pilot arc reference signal from the pilot arc reference signal source 22 and the plasma-arc reference signal from the plasma-arc reference signal source 23. The selection is performed by the reference signal switching circuit 36. The error amplifier 37 amplifies the difference between the output signal of the absolute value converter 33, which Is the absolute-value-converted version of the detection signal from the current detector 11, and the selected one of the pilot arc and plasma-arc reference signals as selected by the reference signal switching circuit 36. The output of the error amplifier 37 is coupled to the PWM control circuit 31.

The PWM control circuit 31 drives the drive circuit 32 in accordance with the output signal of the error amplifier 37 to thereby control the DC power supply 2. The PWM control circuit 31 controls the DC power supply 2 in such a manner that the output signal of the absolute value converter 33 which is the absolute-value-converted version of the detection signal from the current detector 11, becomes equal to the plasma arc reference signal or the pilot arc reference signal.

The plasma-arc cutter with the above-described arrangement operates in the following manner. Let it be assumed that the gap between the main electrode 4 and the nozzle electrode 5 is small, while the gap between the main electrode 4 and the workpiece 6 is large, and that no pilot arc or plasma-arc is present. In this state, neither the pilot current Ip nor the plasma current Ic flows, and, therefore, the detection signal from the current detector 11 is zero. Then, the comparator 51 develops the ON signal so that the switch control 52*a* closes the switch 10 and the switch 34 of the reference signal switching circuit 36 and opens the switch 35.

In this state, the high frequency generator 7 is activated to apply a high frequency voltage between the main electrode 4 and the nozzle electrode 5. This results in a pilot arc between the two electrodes, and the pilot current Ip flows in the pilot arc path 12.

The pilot current Ip is detected by the current detector 11, which develops a negative polarity detection signal corresponding to the magnitude of the pilot current Ip. The detection signal is applied to the comparator 51 and also to the error amplifier 37 via the absolute value converter 33.

The comparator 51 develops the ON signal to the switch control 52*a* because the detection signal from the current detector 11 is of the negative polarity. The switch control 52*a* maintains the switch 10 closed. At the same time, the switch control 52*a* closes the switch 34 of the reference signal switching circuit 36 and opens the switch 35. As a result, the pilot current Ip continues to flow through the pilot arc path 12 to sustain the pilot arc.

The error amplifier 37 amplifies the difference between the output signal of the absolute value converter 33, which is the positive version of the negative detection signal, and the pilot arc reference signal coupled through the switch 34 of the reference signal switching circuit. The error amplifier 37 applies the amplified signal to the Input of the PWM control circuit 31.

The PWM control circuit 31 controls the DC power supply 2 through the drive circuit 32 in accordance with the output signal of the error amplifier 37 in such a manner that the output of the absolute value converter 33 becomes equal to the selected reference signal. In this way, the pilot arc is stabilized.

When the plasma torch 3 is brought closer to the workpieces 6 with the pilot arc being generated, the pilot arc ignites the plasma are 8 between the main electrode 4 and the workpiece 6 so that the plasma current Ic flows In the plasma-arc path 13. The current detector 11 which detects the plasma current Ic develops a positive detection signal.

Then, the comparator 51 provides the OFF signal to the switch control 52*a* because the detection signal from the current detector 11 is positive. The switch control 52*a* opens the switch 10, which interrupts the flow of the pilot current Ip and the pilot arc disappears. As a result, the DC output current Ia of the DC power supply 2 is all assigned to the plasma current Ic, and, therefore, only the plasma current Ic is detected by the current detector 11, which develops a positive polarity detection signal corresponding to the magnitude of the plasma current Ic. Then, the switch control 52*a* opens the switch 34 of the reference signal switching circuit 36 and closes the switch 35 so that the plasma-arc reference signal coupled to the switch 35 is selected.

The error amplifier 37 amplifies the difference between the output signal of the absolute value converter 33 which has the positive polarity, and the selected plasma-arc reference signal, and applies the amplified signal to the input of the PWM control circuit 31.

The PWM control circuit 31 controls the DC power supply 2 via the drive circuit 32 in accordance with the output of the error amplifier 37 in-such a manner that the output signal of the absolute value converter 33 becomes equal to the plasma-arc reference signal. Then, the DC output current Ia of the DC power supply 2, which is the plasma current Ic, is maintained at a constant value determined by the plasma-arc reference signal. In this way, the plasma-arc is stabilized.

The control unit 20*a* uses only one error amplifier, and the switching between the plasma arc reference signal and the pilot arc reference signal can be done in accordance with the polarity of the detection signal as determined by the comparator 51. This simplifies the circuit arrangement of the plasma-arc power supply apparatus.

What is claimed is:

1. A plasma-arc power supply apparatus for supplying DC current to a plasma load which includes a main electrode, a nozzle electrode surrounding said main electrode with a spacing disposed therebetween, and a workpiece spaced from said main electrode, said plasma-arc power supply apparatus comprising:

a main electrode terminal adapted for connection to said main electrode;

a nozzle electrode terminal adapted for connection to said nozzle electrode;

a workpiece terminal adapted for connection to said workpiece;

variable DC power supply means having first and second output terminals, for providing output DC current variable in accordance with a current control signal applied thereto, said first output terminal being connected to said main electrode terminal;

a pilot arc path connected between said second output terminal of said variable DC power supply means and said nozzle electrode terminal for causing pilot arc current from said variable DC power supply means to flow between said main electrode and said nozzle electrode to thereby cause a pilot arc to be generated therebetween;

switch means connected in said pilot arc path and selectively opened and closed in response to an open control signal and a close control signal;

a plasma-arc path connected between said second output terminal and said workpiece terminal for causing plasma-arc current from said variable DC power supply means to flow between said main electrode and said workpiece to thereby cause a plasma-arc to be generated therebetween;

current detecting means having a first input connected to said plasma-arc path and having a second input connected to said pilot arc path for developing a detection signal corresponding to the values of said pilot arc and plasma-arc currents; and control means for providing said close control signal to said switch means and also providing said current control signal corresponding to the difference between said detection signal and a predetermined pilot arc reference signal, to said variable DC power supply means when said detection signal indicates that said pilot arc current is flowing, to thereby control said pilot arc current to have a value corresponding to said predetermined pilot arc reference signal;

said control means providing said open control signal to said switch means and also providing said current control signal corresponding to the difference between said detection signal and a predetermined plasma-arc reference signal, to said variable DC power supply means when said detection signal indicates that said plasma-arc current is flowing, to thereby control said plasma-arc current to have a value corresponding to said predetermined plasma-arc reference signal;

said current detecting means comprising:

a direct current transformer having conductors constituting said pilot arc path and plasma-arc path wound on a core as primary windings, and having a secondary winding wound on said core in which secondary winding transformer current corresponding to current flowing through said respective primary windings flows; and detection signal output means for detecting said transformer current and developing a detection signal corresponding to the magnitude of said transformer current;

wherein:

said plasma-arc path has a larger number of conductor turns wound on said core than said pilot arc path, with the winding direction of said plasma-arc path conductor being opposite to that of said pilot arc path conductor;

said control means comprises:

polarity judging means for providing said open control signal to said switch means when said detection signal is of a first polarity, and providing said close control signal to said switch means when said detection signal is of a second polarity; and variable DC power supply means control means for providing said current control signal corresponding to the difference between said detection signal and said pilot arc current reference signal to said variable DC power supply means when said detection signal is of said first polarity, and providing said current control signal corresponding to the difference between said detection signal and said plasma-arc current reference signal to said variable DC power supply means when said detection signal is of said second polarity.

2. The plasma-arc power supply apparatus according to claim 1 wherein said variable DC power supply means control means comprises:

first error amplifying means for developing an output signal representative of the difference between said detection signal and said pilot arc reference signal;

polarity inverting means for inverting the polarity of said detection signal;

second error amplifying means for developing an output signal representative of the difference between an output signal of said polarity inverting means and said plasma-arc reference signal; and selecting means for selecting the output signal of said first error amplifying means when said detection signal is of said first polarity and selecting the output signal of said second error amplifying means when said detection signal is of said second polarity.

3. The plasma-arc power supply apparatus according to claim 1 wherein said variable DC power supply means control means comprises:

absolute value converting means to which said detection signal is coupled;

selecting means for selecting said pilot arc reference signal in response to said close control signal from said polarity judging means and selecting said plasma-arc reference signal in response to said open control signal from said polarity judging means; and error amplifying means for developing an output signal representative of the difference between the output signal of said absolute value converting means and that one of said pilot arc and plasma-arc reference signals which is selected by said selecting means.

* * * * *